United States Patent

Shimomura et al.

[11] Patent Number: 6,056,811
[45] Date of Patent: May 2, 2000

[54] WATER-BASED INK FOR INK-JET RECORDING, INK-JET RECORDING PROCESS, RECORDING UNIT, INK CARTRIDGE AND INK-JET RECORDING APPARATUS

[75] Inventors: Masako Shimomura, Yokohama; Hiromichi Noguchi, Hachioji, both of Japan

[73] Assignee: Canon Kabushiki Kaisha, Tokyo, Japan

[21] Appl. No.: 09/137,123

[22] Filed: Aug. 20, 1998

[30] Foreign Application Priority Data

Aug. 25, 1997 [JP] Japan .................................. 9-241715

[51] Int. Cl.⁷ .................................................. C09D 11/00
[52] U.S. Cl. ...................................... 106/31.36; 106/31.85
[58] Field of Search ............................ 106/31.58, 31.36

[56] References Cited

U.S. PATENT DOCUMENTS 4,962,190  10/1990  Mayer et al. ........................ 534/573
4,966,607  10/1990  Shinoki et al. ........................ 8/549
5,098,475   3/1992  Winnik et al. ........................ 106/22
5,503,666   4/1996  Mennicke et al. .................... 106/22 H

FOREIGN PATENT DOCUMENTS 0 317 859 A2   5/1989   European Pat. Off. .
0 677 557 A1  10/1995   European Pat. Off. .
WO 97/40108   10/1997   WIPO .

OTHER PUBLICATIONS

Patent Abstracts of Japan, vol. 008, No. 114 (C–225), May 26, 1984 (with respect of JP 59–27973 of Feb. 14, 1984).
H.W. Anderson, "Ink Jet Ink", IBM Technical Disclosure Bulletin, vol. 24, No. 1A, Jun. 1, 1998, p. 420.

*Primary Examiner*—Helene Klemanski
*Assistant Examiner*—Veronica F. Faison
*Attorney, Agent, or Firm*—Fitzpatrick, Cella, Harper & Scinto

[57] ABSTRACT

Disclosed herein is a water-based ink for ink-jet recording, comprising a reaction product between a monosaccharide, disaccharide or polysaccharide and a reactive dye, wherein the monosaccharide has 1 to 3 primary amino groups, 1 to 3 secondary amino groups or 1 to 3 quaternary ammonium groups, the disaccharide has 1 to 3 primary amino groups, 1 to 3 secondary amino groups or 1 to 3 quaternary ammonium group, and the polysaccharide has a weight average molecular weight of at most 4,000.

19 Claims, 5 Drawing Sheets

WATER-BASED INK FOR INK-JET RECORDING, INK-JET RECORDING PROCESS, RECORDING UNIT, INK CARTRIDGE AND INK-JET RECORDING APPARATUS

BACKGROUND OF THE INVENTION

1. Field of the Invention

The present invention relates to a water-based ink for ink-jet recording, an ink-jet recording process, a recording unit, an ink cartridge and an ink-jet recording apparatus.

2. Related Background Art

An ink-jet recording system is a recording system that fine ink droplets are formed by one of various methods, and the ink droplets are directly applied to a recording medium such as paper. Water-based inks are principally used as ink-jet recording inks from the viewpoints of safety, odor and the like. These inks are composed of a water-soluble dye or pigment, a water-soluble organic solvent (anti-crusting agent) used for preventing clogging by drying within an ejection nozzle, water, and optional components such as a penetrant, a dye-dissolving aid and a mildewproofing agent.

With the development of high-performance personal computers and the standardization of GUI environment, performance required of ink-jet inks includes the compatibility of high-sped printing with image quality. In particular, performance required of coloring materials includes reliability, coloration, fastness properties and the like. In response to these performance requirements, direct dyes and acid dyes have been used to date. However, the use of these dyes has been unable to achieve satisfactory performance in fastness properties in particular. Recently, pigment inks of a black color have been commercialized, and image quality and coloration have been improved. However, such a pigment ink is poor in reliability compared with dye inks. Color pigments such as yellow, cyan and magenta pigments are excellent in fastness properties, but poor in light transmission property, and are difficult to reach the level of dyes in coloration, to say nothing of reliability.

Various dyes (reactive dyes) having a reactive group in their molecules are coloring materials excellent in reliability, coloration, light fastness, resistance to ozone, etc. In recent years, it has been attempted to react these reactive dyes with a polymer to improve their water fastness, so as to use the reaction products as coloring materials for ink-jet. For example, in Japanese Patent Publication No. 62-16232, dyes having a chlorotriazine or vinylsulfone group are reacted with a polyhydric alcohol or formamide to use the reaction products as coloring materials for inks. Since the polyhydric alcohol and formamide have high water solubility, however, the hydrolysis of the reactive dyes occurs more easily than the reaction with these polymers. Therefore, the synthesis itself is difficult, and moreover purification after synthesis is also difficult. Besides, since the reactive dyes undergo a reaction under alkaline conditions, the reactants must be kept at pH 11 to 12 with sodium hydroxide or the like. However, the use of such high-alkaline inks markedly limits materials for parts, with which the inks come into contact, in all recording including ink-jet recording, and besides causes a problem of safety. Therefore, such an ink must be neutralized with an acid. Further, in systems such as ink-jet systems, in which ink are passed through fine nozzles or tubes, a salt may be deposited in such nozzles or tubes in some cases, resulting in clogging. Therefore, treatments such as desalting are also required.

In Japanese Patent Application Laid-Open No. 62-119279, a specific reactive dye is reacted with polyethyleneimine having a molecular weight of from 10,000 to 70,000 to obtain a coloring material having good water fastness. When polyethyleneimine having such a high molecular weight is used, however, the reaction product with the dye becomes a giant molecule. Therefore, the viscosity of the resulting ink becomes high, and so ink-jet suitability of the ink, such as followability, is deteriorated. In addition, a proportion of chromophore in the molecule becomes low, so that the composition of the ink is limited. Further, the pH of the synthesized product becomes strongly alkaline due to an unreacted imino group, since the imino group shows strong alkalinity, so that inks using such a synthesized product as a coloring material also shows strong alkalinity. Therefore, when such a synthesized product is used, materials for parts, with which the resulting ink comes into contact, are markedly limited, and moreover a problem of safety arises. Therefore, it is necessary to make the pH of the ink neutral by conducting neutralization with an acid or reacting an excess amount of a reactive dye to the imino group. However, when the imino group is neutralized, the resulting dye compound loses water solubility. Therefore, a problem that the dye compound aggregates and precipitates has arisen.

SUMMARY OF THE INVENTION

The present invention has been completed in view of the above-described problems involved in the prior art, and it is an object of the present invention to improve poor water fastness, which is a demerit of the conventional reactive dyes, while making the best use of merits (for example, good coloration, light fastness and light transmission property) thereof, and to provide a water-based ink for ink-jet recording, by which ink-jet ejection property is improved, storage stability is enhanced, discoloration (so-called bronzing) of the resulting print is prevented, and the dependence of image quality on recording media is suppressed.

Another object of the present invention is to provide an ink-jet recording process which permits the provision of a print having excellent coloration, light fastness and light transmission property and improved water fastness, and undergoing little discoloration, and of prints having excellent image quality when printed on various recording media.

A further object of the present invention is to provide an ink-jet recording apparatus which can print a print having excellent coloration, light fastness and light transmission property and improved water fastness, and undergoing little discoloration, and conduct printing with excellent image quality when printed on various recording media, and a recording unit and an ink cartridge which are used in the recording apparatus.

The above objects can be achieved by the present invention described below.

In one aspect of the present invention, there is thus provided a water-based ink for ink-jet recording, comprising a reaction product between a monosaccharide, disaccharide or polysaccharide and a reactive dye, wherein the monosaccharide has 1 to 3 primary amino groups, 1 to 3 secondary amino groups or 1 to 3 quaternary ammonium groups, the disaccharide has 1 to 3 primary amino groups, 1 to 3 secondary amino groups or 1 to 3 quaternary ammonium groups, and the polysaccharide has a weight average molecular weight of at most 4,000.

In another aspect of the present invention, there is also provided a water-based ink for ink-jet recording, comprising a reaction product between a reactive dye and a glycol having a weight average molecular weight within a range of from 200 to 3,000, and having 1 or 2 primary amino groups, or 1 or 2 quaternary ammonium groups.

In a further aspect of the present invention, there is also provided a water-based ink for ink-jet recording, comprising a reaction product between a reactive dye and an ethylene oxide adduct of glycerol, wherein the ethylene oxide adduct has from 15 to 90 ethylene oxide units in the molecular thereof, and has 1 to 3 primary amino groups or 1 to 3 quaternary ammonium groups in the molecular thereof.

In a still further aspect of the present invention, there is also provided a water-based ink for ink-jet recording, comprising a reaction product between 1 to 3 moles of a reactive dye and 1 mole of an ethyleneimine derivative having a weight average molecular weight of at most 1,000.

In an aspect of the present invention, there is provided an ink-jet recording process comprising the step of applying energy to any one of a water-based ink for ink-jet recording, comprising a reaction product between a monosaccharide, disaccharide or polysaccharide and a reactive dye, wherein the monosaccharide has 1 to 3 primary amino groups, 1 to 3 secondary amino groups or 1 to 3 quaternary ammonium groups, the disaccharide has 1 to 3 primary amino groups, 1 to 3 secondary amino groups or 1 to 3 quaternary ammonium groups, and the polysaccharide has a weight average molecular weight of at most 4,000, a water-based ink for ink-jet recording, comprising a reaction product between a reactive dye and a glycol having a weight average molecular weight within a range of from 200 to 3,000, and having 1 or 2 primary amino groups, or 1 or 2 quaternary ammonium groups, a water-based ink for ink-jet recording, comprising a reaction product between a reactive dye and an ethylene oxide adduct of glycerol, wherein the ethylene oxide adduct has from 15 to 90 ethylene oxide units in the molecular thereof, and has 1 to 3 primary amino groups or 1 to 3 quaternary ammonium groups in the molecular thereof, and a water-based ink for ink-jet recording, comprising a reaction product between 1 to 3 moles of a reactive dye and 1 mole of an ethyleneimine derivative having a weight average molecular weight of at most 1,000, to eject the ink from an orifice of a recording head toward a recording medium, thereby applying the ink to the recording medium to conduct recording.

In an aspect of the present invention, there is also provided a recording unit comprising an ink container portion with any one of a water-based ink for ink-jet recording, comprising a reaction product between a monosaccharide, disaccharide or polysaccharide and a reactive dye, wherein the monosaccharide has 1 to 3 primary amino groups, 1 to 3 secondary amino groups or 1 to 3 quaternary ammonium groups, the disaccharide has 1 to 3 primary amino groups, 1 to 3 secondary amino groups or 1 to 3 quaternary ammonium groups, and the polysaccharide has a weight average molecular weight of at most 4,000, a water-based ink for ink-jet recording, comprising a reaction product between a reactive dye and a glycol having a weight average molecular weight within a range of from 200 to 3,000, and having 1 or 2 primary amino groups, or 1 or 2 quaternary ammonium groups, a water-based ink for ink-jet recording, comprising a reaction product between a reactive dye and an ethylene oxide adduct of glycerol, wherein the ethylene oxide adduct has from 15 to 90 ethylene oxide units in the molecular thereof, and has 1 to 3 primary amino groups or 1 to 3 quaternary ammonium groups in the molecular thereof, and a water-based ink for ink-jet recording, comprising a reaction product between 1 to 3 moles of a reactive dye and 1 mole of an ethyleneimine derivative having a weight average molecular weight of at most 1,000 held therein, and a recording head equipped with a means for applying energy to the ink to eject the ink from an orifice.

In an aspect of the present invention, there is also provided an ink cartridge comprising an ink container portion with any one of a water-based ink for ink-jet recording, comprising a reaction product between a monosaccharide, disaccharide or polysaccharide and a reactive dye, wherein the monosaccharide has 1 to 3 primary amino groups, 1 to 3 secondary amino groups or 1 to 3 quaternary ammonium groups, the disaccharide has 1 to 3 primary amino groups, 1 to 3 secondary amino groups or 1 to 3 quaternary ammonium groups, and the polysaccharide has a weight average molecular weight of at most 4,000, a water-based ink for ink-jet recording, comprising a reaction product, between a reactive dye and a glycol having a weight average molecular weight within a range of from 200 to 3,000, and having 1 or 2 primary amino groups, or 1 or 2 quaternary ammonium groups, a water-based ink for ink-jet recording, comprising a reaction product between a reactive dye and an ethylene oxide adduct of glycerol, wherein the ethylene oxide adduct has from 15 to 90 ethylene oxide units in the molecular thereof, and has 1 to 3 primary amino groups or 1 to 3 quaternary ammonium groups in the molecular thereof, and a water-based ink for ink-jet recording, comprising a reaction product between 1 to 3 moles of a reactive dye and 1 mole of an ethyleneimine derivative having a weight average molecular weight of at most 1,000 held therein.

In one aspect of the present invention, there is also provided an ink-jet recording apparatus comprising a recording unit which has an ink container portion with any one of a water-based ink for ink-jet recording, comprising a reaction product of between a monosaccharide, disaccharide or polysaccharide and a reactive dye, wherein the monosaccharide has 1 to 3 primary amino groups, 1 to 3 secondary amino groups or 1 to 3 quaternary ammonium groups, the disaccharide has 1 to 3 primary amino groups, 1 to 3 secondary amino groups or 1 to 3 quaternary ammonium groups, and the polysaccharide has a weight average molecular weight of at most 4,000, a water-based ink for ink-jet recording, comprising a reaction product between a reactive dye and a glycol having a weight average molecular weight within a range of from 200 to 3,000, and having 1 or 2 primary amino groups, or 1 or 2 quaternary ammonium groups, a water-based ink for ink-jet recording, comprising a reaction product between a reactive dye and an ethylene oxide adduct of glycerol, wherein the ethylene oxide adduct has from 15 to 90 ethylene oxide units in the molecular thereof, and has 1 to 3 primary amino groups or 1 to 3 quaternary ammonium groups in the molecular thereof, and a water-based ink for ink-jet recording, comprising a reaction product between 1 to 3 moles of a reactive dye and 1 mole of an ethyleneimine derivative having a weight average molecular weight of at most 1,000 held therein and a recording head equipped with a means for applying energy to the ink to eject the ink from an orifice, and a means for driving the recording unit in response to signals to eject the ink.

In another aspect of the present invention, there is also provided an ink-jet recording apparatus comprising an ink cartridge having an ink container portion with any one of a water-based ink for ink-jet recording, comprising a reaction product between a monosaccharide, disaccharide or polysaccharide and a reactive dye, wherein the monosaccharide has 1 to 3 primary amino groups, 1 to 3 secondary amino groups or 1 to 3 quaternary ammonium groups, the disaccharide has 1 to 3 primary amino groups, 1 to 3 secondary amino groups or 1 to 3 quaternary ammonium groups, and the polysaccharide has a weight average molecular weight of at most 4,000, a water-based ink for ink-jet recording, comprising a reaction product between a reactive dye and a glycol having a weight average molecular weight within a range of from 200 to 3,000, and having 1 or 2 primary amino groups, or 1 or 2 quaternary ammonium groups, a water-based ink for ink-jet recording, comprising a reaction product between a reactive dye and an ethylene oxide adduct of glycerol, wherein the ethylene oxide adduct has from 15 to 90 ethylene oxide units in the molecular thereof, and has 1 to 3 primary amino groups or 1 to 3 quaternary ammonium groups in the molecular thereof, and a water-based ink for ink-jet recording, comprising a reaction product between 1 to 3 moles of a reactive dye and 1 mole of an ethyleneimine derivative having a weight average molecular weight of at most 1,000 held therein, a recording head equipped with a means for applying energy to the ink to eject the ink from an orifice, and a means for driving the recording head in response to signals to eject the ink.

According to the above aspects of the present invention, discoloration (the so-called bronzing) on a recording medium after printing can be suppressed compared with the conventional inks. A scatter of image quality when conducting printing on various recording media can also be narrowed, and the dependence of image quality on recording media can thus be suppressed, so that high-quality images can be recorded on various kinds of recording media. In addition, ink-jet ejection property and storage stability of the inks are also excellent.

No reason why such effects are brought about by the present invention has been known. With respect to the prevention of bronzing by way of example, however, it is considered to be due to the fact that the amino compound bonded to the reactive dye takes in dye molecules to prevent association between the dye molecules, and their crystallization. With respect to the point that high-quality printing can be allowed irrespective of the kinds of recording media, it is considered to be due to the fact that the coloring material tends to remain on the surfaces of recording media compared with the conventional reactive dyes, and so the image quality is hard to be affected by a difference in ink absorbency among the recording media.

With respect to the enhancement of the ink-jet ejection property and storage stability, it is considered to be due to results brought about by suitably selecting the kinds of the reactive dye and the amino compound bonded thereto and the molecular weight of the amino compound.

DESCRIPTION OF THE PREFERRED EMBODIMENTS

Figure 1:
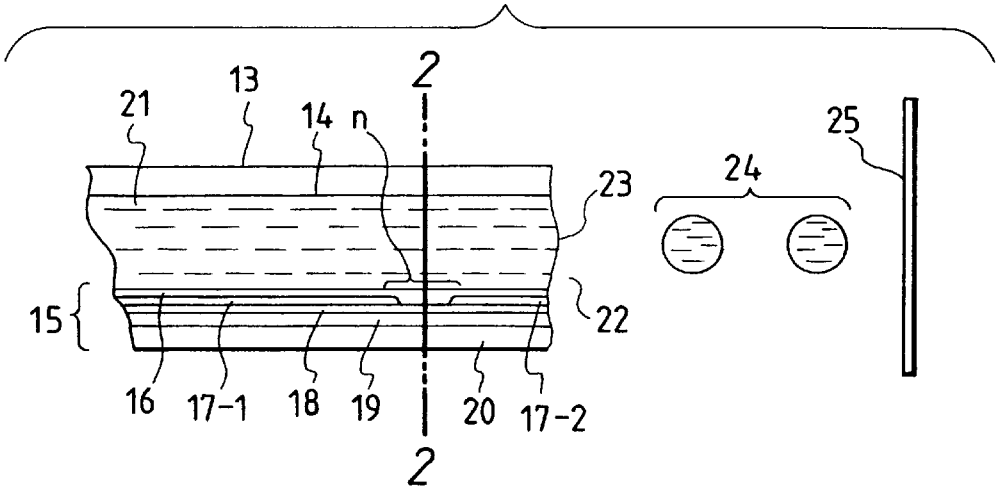
FIG. 1 is a longitudinal cross-sectional view of a head of an ink-jet recording apparatus.

The present invention will hereinafter be described in detail.

The water-based ink for ink-jet recording according to an embodiment of the present invention preferably includes a reaction product between a monosaccharide, disaccharide or polysaccharide and a reactive dye, wherein the monosaccharide has 1 to 3 primary amino groups, 1 to 3 secondary amino groups or 1 to 3 quaternary ammonium groups, the disaccharide has 1 to 3 primary amino groups, 1 to 3 secondary amino groups or 1 to 3 quaternary ammonium groups, and the polysaccharide has a weight average molecular weight of at most 4,000.

The water-based ink for ink-jet recording according to another embodiment of the present invention preferably includes a reaction product between a reactive dye and a glycol having a weight average molecular weight within a range of from 200 to 3,000, and having 1 or 2 primary amino groups, or 1 or 2 quaternary ammonium groups.

The water-based ink for ink-jet recording according to a further embodiment of the present invention preferably includes a reaction between a reactive dye and an ethylene oxide adduct of glycerol, wherein the ethylene oxide adduct has from 15 to 90 ethylene oxide units in the molecular thereof, and has 1 to 3 primary amino groups or 1 to 3 quaternary ammonium groups in the molecular thereof.

The water-based ink for ink-jet recording according to a still further embodiment of the present invention preferably includes a reaction product between 1 to 3 moles of a reactive dye and 1 mole of an ethyleneimine derivative having a weight average molecular weight of at most 1,000.

Since an amino compound having a strong alkalinity is used in the reaction with the reactive dye, the reaction is feasible by virtue of amino compound's own alkali. It is therefore unnecessary to add an additional alkaline compound to cause the reaction. Further, it is possible to completely react cationic groups such as primary amino groups, secondary amino groups or quaternary ammonium groups in the amino compound with the reactive dye by defining the kinds and number of the cationic groups in the amino compound molecule and selecting reactive groups of the reactive dye reacted therewith. For this reason, the reaction is easy to control, the number of by-products formed can be decreased, and the pH of the reaction mixture after the reaction can be made nearly neutral.

In particular, since an amino compound having at least one primary amino group, secondary amino group or quaternary ammonium group tends to react with reactive groups in the reactive dye molecule, for example, a vinylsulfone group, a chlorotriazine group, a nicotinic group, etc., the reaction is feasible under relatively mild conditions, for example, low-temperature and low-pressure conditions. Since the synthetic reaction occurs more easily than the hydrolysis of the reactive dye, a yield becomes high, and separation of unreacted compounds and purification of the reaction product are easy to conduct after the reaction.

The ink including the reaction product of a monosaccharide, a disaccharide, a polysaccharide having a weight average molecular weight of at most 4,000, a glycol having a weight average molecular weight within a range of from 200 to 3,000, an ethylene oxide adduct (the total number of ethylene oxide groups: 15 to 90) of glycerol, or an ethyleneimine derivative having a weight average molecular weight of at most 1,000 as an amino compound with a reactive dye has a low viscosity and a high molar extinction coefficient and is excellent in solubility in water, ejection stability and storage stability.

The inks obtained by separately using the reaction products according to the present invention are more effective for the prevention of discoloration (bronzing) after printing compared with the conventional inks and have good compatibility with the wide range of recording media. The reasons for it are considered to be as follows.

With respect to the prevention of bronzing, it is considered that the amino compound covalently bonded to the reactive dye takes in dye molecules to prevent association between the dye molecules, and their crystallization, and so occurrence of bronzing is prevented.

With respect to the good compatibility with the wide range of recording media, it is considered that the coloring material tends to remain on the surfaces of recording media compared with the conventional inks, and so the image quality is hard to be affected by a difference in ink absorbency among the recording media. The reason why the coloring material remains on the surface of the recording medium is considered to be due to the fact that the ink tends to increase its viscosity on the recording medium due to evaporation of water and a solvent in the ink, and so the penetration of the ink is controlled.

The amino compounds useful in the practice of the present invention will hereinafter be described in detail.

First of all, the monosaccharide or disaccharide having 1 to 3 primary amino groups, secondary amino groups or quaternary ammonium groups in its molecule will be described. The polysaccharide used herein includes water-soluble chitosan (for example, succinylated chitosan and the like) and water-soluble cellulose. When the polysaccharide is used as the amino compound according to the present invention, it is preferred from the viewpoint of improving the ink-jet ejection property and the like of the resulting ink that its weight average molecular weight be limited to 4,000 or lower. When the monosaccharide, disaccharide or polysaccharide is used, for example, a modifying group (for example, hydroxyl or acetyl group) for enhancing solubility in an aqueous medium may be introduced into a site other than sites at which the primary amino groups, secondary amino groups or quaternary ammonium groups are bonded. An alkyl ether group having at least 4 carbon atoms, such as a butyl ether group, which has an activating effect and an anti-foaming effect, may be bonded within limits not greatly affecting the water solubility and the like of the reaction product, thereby controlling the properties of the ink. Specific examples of monosaccharides, disaccharides and polysaccharides usable in the present invention are shown below.

Monosaccharides:

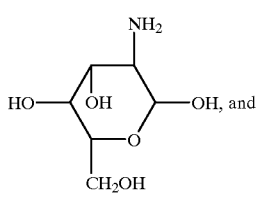
(1)

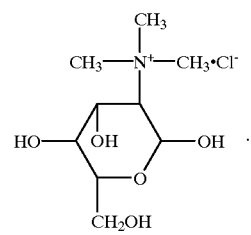
(2)

Disaccharides:

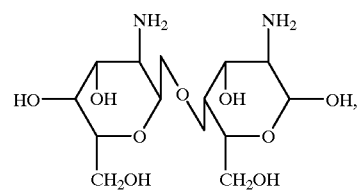
(3)

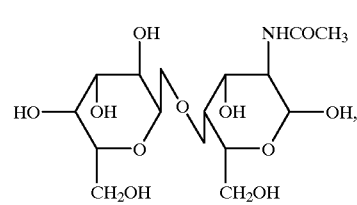
(4)

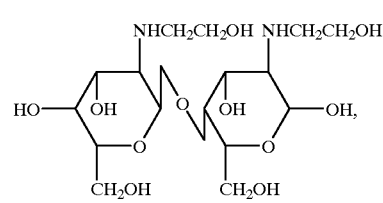
(5)

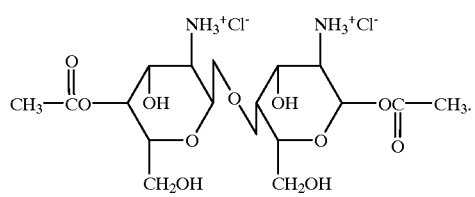
(6)

Polysaccharides:

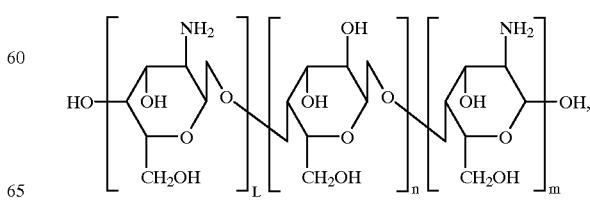
(7)

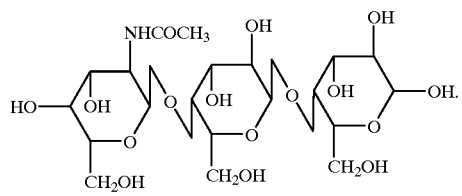
(8)

The glycol having 1 or 2 primary amino groups or quaternary ammonium groups in its molecule is a compound which can be reacted with comparative ease with the reactive dye. As such a glycol, there may be used that having a weight average molecular weight within a range of from 200 to 3,000. By selecting such a range of molecular weight, the bronzing caused by association between dye molecules and their crystallization is prevented. In addition, the fixing ability of the resulting ink to the surfaces of recording media is enhanced. Further, its reaction product with the reactive dye is prevented from becoming a giant molecule, so that the reaction product has little or no adverse influence on the ink-jet ejection property and storage stability of the resulting ink.

Specific examples of glycols usable in the present invention are shown below.
Polyethylene glycol derivatives:

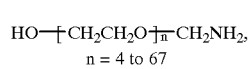
(9)

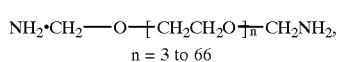
(10)

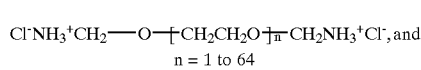
(11)

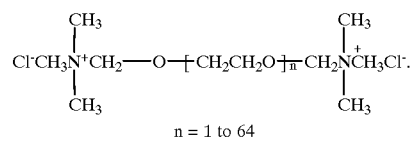
(12)

An ethylene oxide adduct of glycerol, which has 1 to 3 primary amino groups or quaternary ammonium groups in its molecule, is also a preferred compound, since it has good reactivity to the reactive dye. In such an ethylene oxide adduct of glycerol, it is preferred that the total number of ethylene oxide groups in its molecule be controlled to 15 to 90. If the number of ethylene oxide groups is smaller than 15, the reactive dye cannot be covalently bonded to all of three cationic terminal groups due to steric hindrance between dye molecules. If the number of ethylene oxide groups is greater than 90 on the other hand, the resulting reaction product becomes a giant molecule, so that the molar extinction coefficient of the resulting ink is reduced, and a problem arises as to its ejection property.

Specific examples of ethylene oxide adducts of glycerol usable in the present invention are shown below. Ethylene oxide adducts of glycerol:

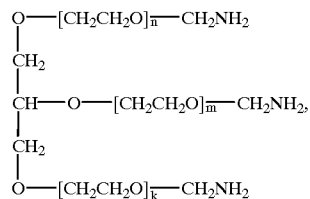
(13)

$n+m+k=15$ to $90$

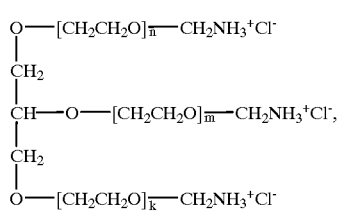
(14)

$n+m+k=15$ to $90$

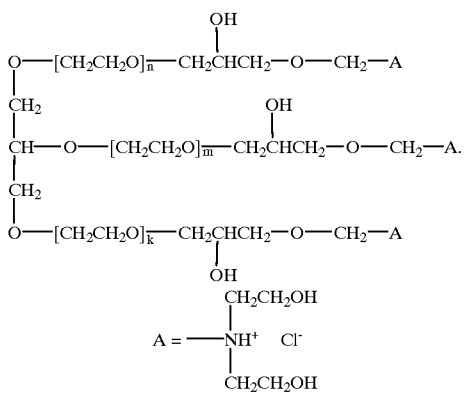
(15)

$n+m+k=15$ to $90$

Lastly, the ethyleneimine derivative useful in the practice of the present invention preferably has a weight average molecular weight of at most 1,000. The limitation of the weight average molecular weight to at most 1,000 can prevent its reaction product with the reactive dye from becoming a giant molecule, so that reduction in the molar extinction coefficient of the resulting ink and deterioration of the ejection property thereof can be prevented. It is also possible to prevent the pH thereof from rising. Further, in order to prevent the resulting ink from deteriorating the ink-jet ejection property, it is preferred that 1 to 3 moles of the reactive dye be reacted with 1 mole of the ethyleneimine derivative.

Specific examples of ethyleneimine derivatives usable in the present invention are shown below.

Polyethyleneimine derivatives:

$$CH_3CH_2NH-(CH_2CH_2N)_{\overline{n}}-CH_2CH_2NH_2, \quad (16)$$
$$\underset{COCH_3}{|}$$

n=1 to 20

$$HO-(CH_2CH_2N)_{\overline{n}}-CH_2CH_2NH_2. \quad (17)$$
$$\underset{COCH_3}{|}$$

n=1 to 21

Examples of the reactive dye used in the water-soluble inks according to the present invention include reactive dyes described in COLOR INDEX. Besides such dyes, those having a basic structure of reactive dyes represented below may also be used.

D—T—X wherein D is a chromogen, T is a linking group, and X is a reactive group.

As the chromogen (D), there may be used a chromogenic conjugating system of a low molecular weight containing a sulfonic group. Preferable examples thereof include pyrazolone azo, naphthalene azo, anthraquinone, formalin and phthalocyanine types. However, triphenylmethane and xanthene types may also be used.

Specific examples of the reactive group (X) include halogenated triazine groups (monochlorotriazine group, dichlorotriazine group, trichlorotriazine group, etc.) having an amino group as a linking group, vinylsulfone groups having a sulfone group or an amino group as a linking group, and nicotinic acid groups having an amino group as a linking group.

Specific examples of the monochlorotriazine groups include those represented by the structural formulae (I)

[chlorotriazine structure with —NH— and NHR substituents]

wherein R is H, CH$_3$, (II)

[benzene ring with CH$_3$ and —SO$_2$CH$_2$CH$_2$OSO$_3$H]

[benzene ring with —SO$_3$H] or [benzene ring with CH$_3$ and —SO$_3$H, and]

-continued

[chlorotriazine structure with —HN— and OCH$_3$ substituents]

A specific example of the dichlorotriazine groups includes that represented by the structural formula (III)

[dichlorotriazine structure with —NH— substituent]

Specific examples of the vinylsulfone groups include those represented by the following structural formulae —SO$_2$—CH$_2$CH$_2$—O—SO$_3$Na (IV), —SO$_2$—NHCH$_2$CH$_2$—O—SO$_3$Na (IV), and (VI)

[—NHCO— linked to cyclohexane ring with H, CH$_2$, and SO$_2$CH=CH$_2$ substituents]

A specific example of the nicotinic acid groups includes that represented by the following structural formula (VII)

[triazine structure with —NH—, NHR, and pyridine-COOH substituents]

wherein R is H, CH$_3$,

[benzene ring with CH$_3$ and —SO$_2$CH$_2$CH$_2$OSO$_3$H]

[benzene ring with CH$_3$ and —SO$_3$H or] [benzene ring with —SO$_3$H.]

As the reactive dye useful in the practice of the present invention, it is preferred to use a dye the reaction product with the amino compound of which comes to have a solubility in water of at least 10% by weight, preferably 30 to 90% by weight at a pH ranging from 5 to 10, preferably from 6 to 9 in the terms of materials for parts with which the resulting ink comes into contact, and safety.

Examples of such reactive dyes include the following dyes:

Chlorotriazine type: Kayacion P Yellow P-38G, Yellow P-5G, Yellow P-4G, Yellow P-N3R, Red P-3BN, Turquoise P-3GF, Black P-NBR, Black P-N, Black P-GS; Kayacion P-7G Yellow P-5G, Yellow P-N3R, Red P-BN, Turquoise P-3GF, Black P-N, Black P-NBR, Black P-GS, Red A-3B, Yellow E-MS, Red E-MS, Lemon Yellow E-CM Clean, Yellow E-CM Clean, Red E-CM, Red E- SN7B, Yellow E-SN4G, Yellow E-SNA, Red E-S3B, Red E-8BN and Turquoise E-NA (all, products of Nippon Kayaku Co., Ltd.); YELLOW E-3G, YELLOW E-G, YELLOW E3R, GOLD YELLOW E-R, Orange E-2G, Orange E-2R, RED E-B, RED E-7B, Turquoise E-G, Green E-6B, Brilliant Yellow P3GN, Yellow P-3R, Brilliant Red P-B, Brilliant Red P-3B, Brilliant Blue P-3R, Brilliant Blue P-BR, Brilliant Blue P-BR and Turquoise Blue P-GR (all, products of BASF AG); Yellow 5G, Red B, Red 3B, Turquoise Blue GF, Turquoise Blue B, Black BG-A and Black 2G (all, products of Mitsubishi Kagaku Co., Ltd.); Procion Yellow SP-8G, Procion Yellow P-4G, Procion Yellow P-3R, Procion Red P-4BN, Turquoise SP-2G, Black P-2R and Black SP-L (all, products of ICI, Ltd.); and Cibacron Yellow 6GS, Cibacron Yellow 3G, Golden Yellow 2R, Cibacron Blue 4GN, Cibacron Turquoise GR, Cibacron Black GR, Cibacron Black 2PD, Cibacron Yellow 6G, Cibacron Yellow 3G, Cibacron Yellow 2G, Cibacron Golden Yellow 2R, Cibacron Red B, Cibacron Red 3B, Cibacron Red 6B, Cibacron Blue 4G, Cibacron Turquoise GF, Cibacron Turquoise GR and Cibacron Black 2PD (all, products of CIBA-GEIGY AG); Vinylsulfone type: Duasyn-Brilliant Yellow GL-SF VP 220, Red 3B-SF VP 346, Yellow R-GL liquid, Red R-F3B liquid, Blue R-KG liquid, Green R-K6B liquid and Black R-KRL liquid (all, products of Hoechst AG); Duasyn-Brill. Yellow 7GL, Brill. Yellow 4GL, Brill. Yellow GL, Yellow FG, Yellow GNL, Yellow GR, Golden Yellow G, Brill. Red BB, Brill. Red 5B, Red FG-SN, Red 2B-SN, Turquoise Blue B, Turquoise Blue G, Black AN, Black KN, Black R-KN and Black DEN Hi-Gran (all, products of Mitsubishi Kasei Hoechst K.K.); and Sumifix Supra Brilliant Yellow 3GF, Yellow 3RF, Brilliant Red BSF, Brilliant Red 3BF, Turquoise Blue B GF, Sumifix Yellow 2GL, Yellow FG, Yellow GN, Yellow GRS, Yellow R, Golden Yellow GG, Brilliant Red 5BS, Turquoise Blue G, Black B, Black ENS, Black EX, BLACK EDS and BLACK PBS (all, products of Sumitomo Chemical Co., Ltd.); and Nicotinic type: Kayacelon React Colours Yellow CN-4G, Yellow CN-SL, Yellow CN-ML, Yellow CN-RL, Red CN-3B, Red CN-7B and Turquoise CN-2G (all, products of Nippon Kayaku Co., Ltd.).

The content of the reaction product in the water-based inks according to the present invention is within a range of from 0.5 to 90% by weight, preferably from 5 to 50% by weight, based on the total weight of each ink.

Besides the reaction product, the water-based inks according to the present invention contain, as an aqueous medium, water-soluble solvents such as a water-soluble humectant and a penetrant, and water.

Examples of the water-soluble humectant include ethylene glycol, diethylene glycol, triethylene glycol, tripropylene glycol, glycerol, 1,2,4-butanetriol, 1,2,6-hexanetriol, 1,2,5-pentanetriol, 1,2-butanediol, 1,3-butanediol, 1,4-butanediol, dimethyl sulfoxide, diacetone alcohol, glycerol monoallyl ether, propylene glycol, butylene glycol, polyethylene glycol 300, thiodiglycol, N-methyl-2-pyrrolidone, 2-pyrrolidone; γ-butyrolactone, 1,3-dimethyl-2-imidazolidinone, sulfolane, trimethylolpropane, trimethylolethane, neopentyl glycol, ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, propylene glycol monomethyl ether, dipropylene glycol monomethyl ether, bis-β-hydroxymethyl sulfone, bis-β-hydroxyethyl sulfone, bis-β-hydroxyethyl urea, urea, acetonylacetone, pentaerythritol and 1,4-cyclohexanediol.

Examples of the penetrant include hexylene glycol, ethylene glycol monopropyl ether, ethylene glycol monobutyl ether, ethylene glycol monoisobutyl ether, ethylene glycol monophenyl ether, diethylene glycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propylene glycol monobutyl ether, dipropylene glycol monoethyl ether, dipropylene glycol monopropyl ether, dipropylene glycol monobutyl ether, tripropylene glycol monomethyl ether, glycerol monoacetate, ethylene glycol monomethyl ether acetate, diethylene glycol monomethyl ether acetate, cyclohexanol, 1,2-cyclohexanediol, 1-butanol, 3-methyl-1,5-pentanediol, 3-hexene-2,5-diol, 2,3-butanediol, 1,5-pentanediol, 2,4-pentanediol, 2,5-hexanediol, ethanol, n-propanol, 2-propanol, 1-methoxy-2-propanol, furfuryl alcohol and tetrahydrofurfuryl alcohol.

The total amount of such water-soluble solvents contained in the water-based inks as described above is within a range of from 5 to 50% by weight, preferably 5 to 40% by weight, based on the total weight of each ink. If the amount is less than 5% by weight, the anti-crusting effect thereof becomes poor. If the amount exceeds 50% by weight on the other hand, the initial viscosity of the resulting ink is increased, and besides the penetrability of the ink is enhanced, and so such evils that the effect of change of state by heat is reduced, and prints become sticky are brought.

Purified water or deionized water is used as the water, and the content of the water in the inks is preferably within a range of generally from 10 to 90% by weight, more preferably from 30 to 80% by weight, based on the total weight of each ink.

As necessary, the water-based inks according to the present invention may further contain additives such as a surfactant, a rust preventive, a mildewproofing agents, an antioxidants and a pH adjustors.

No particular limitation is imposed on the recording medium used in the recording process according to the present invention, and plain paper such as paper for copying, bond paper and letter paper, and coated paper, glossy paper and films for OHP specially prepared for ink-jet recording are suitably used.

Recording apparatus used in the present invention will now be described. As a preferred method and apparatus for conducting recording by using the inks according to the present invention, may be mentioned an ink-jet recording method and ink-jet recording apparatus in which thermal energy corresponding to recording signals is applied to an ink within a recording head, and the ink is ejected by the thermal energy.

Figure 2:
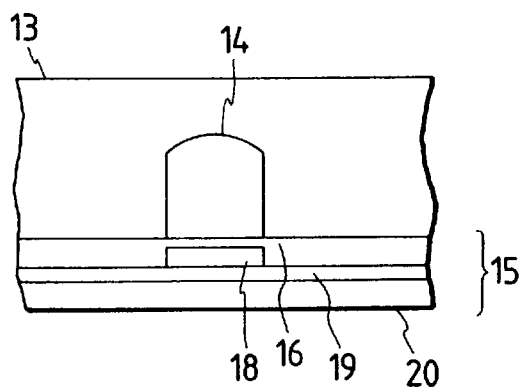
FIG. 2 is a transverse cross-sectional view of the head of the ink-jet recording apparatus.
Figure 3:
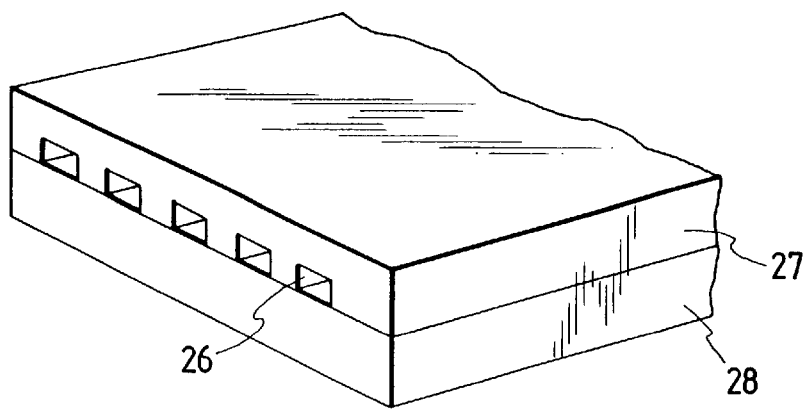
FIG. 3 is a perspective view of the appearance of another head of the ink-jet recording apparatus.

Examples of the construction of a recording head, which is a main component of such an apparatus, are illustrated in FIGS. 1, 2 and 3.

A head 13 is formed by bonding a glass, ceramic or plastic plate or the like having a groove 14 through which an ink is passed, to a heating head 15 having a heating resistor, which is used for thermal recording (the drawings show a head to which, however, the invention is not limited). The heating head 15 is composed of a protective film 16 made of silicon oxide, silicon nitride, silicon carbide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice (a minute opening) 22 and forms a meniscus 23 due to a pressure not illustrated.

Now, upon application of electric signals to the electrodes 17-1 and 17-2, the heating head 15 rapidly generates heat at the region shown by n to form bubbles in the ink 21 which is in contact with this region. The meniscus 23 of the ink is projected by the pressure thus produced, and the ink 21 is ejected from the ejection orifice 22 to a recording medium 25 in the form of minute droplets 24.

FIG. 3 illustrates an appearance of a multi-head composed of an array of a number of heads as shown in FIG. 1. The multi-head is formed by closely bonding a glass plate 27 having a number of grooves 26 to a heating head 28 similar to the head as illustrated in FIG. 1.

Incidentally, FIG. 1 is a cross-sectional view of the head 13 taken along the flow path of the ink, and FIG. 2 is a cross-sectional view taken along line 2—2 in FIG. 1.

Figure 4:
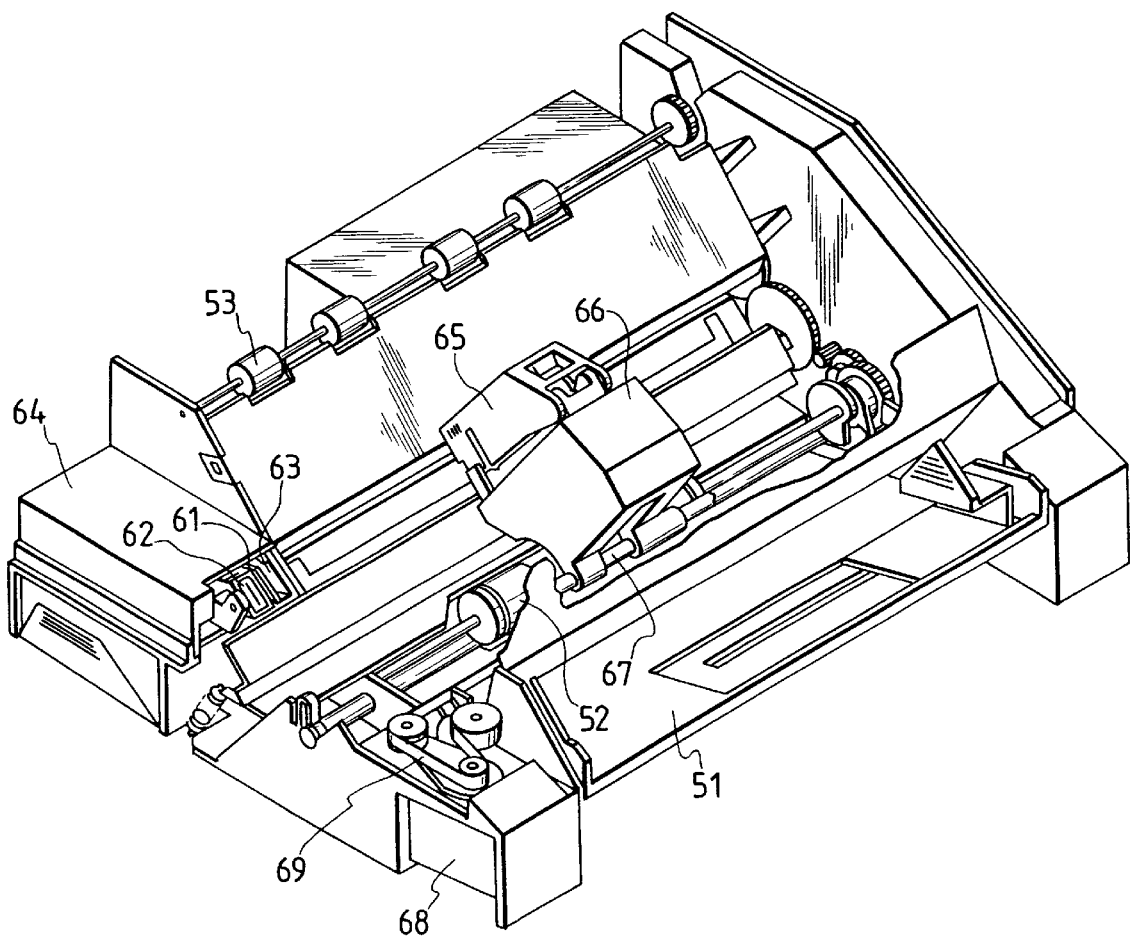
FIG. 4 is a perspective view illustrating an exemplary ink-jet recording apparatus.

FIG. 4 illustrates an example of an ink-jet recording apparatus in which the above head has been incorporated.

In FIG. 4, reference numeral 61 designates a blade serving as a wiping member, one end of which is a stationary end held by a blade-holding member to form a cantilever. The blade 61 is provided at a position adjacent to a region in which a recording head 65 operates, and in this embodiment, is held in such a form that it protrudes into the course through which the recording head 65 is moved. Reference numeral 62 indicates a cap for a face of ejection openings of the recording head 65, which is provided at a home position adjacent to the blade 61, and is so constructed that it moves in a direction perpendicular to a direction in which the recording head 65 is moved, and comes into contact with the face of ejection openings to cap it. Reference numeral 63 denotes an ink-absorbing member provided adjoiningly to the blade 61 and, similar to the blade 61, held in such a form that it protrudes into the course through which the recording head 65 is moved. The above-described blade 61, cap 62 and ink-absorbing member 63 constitute an ejection-recovery portion 64, where the blade 61 and ink-absorbing member 63 remove water, dust and/or the like from the face of the ink-ejecting openings.

Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a feeding part from which the recording media are separately inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording.

In the above construction, the cap 62 in the head recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
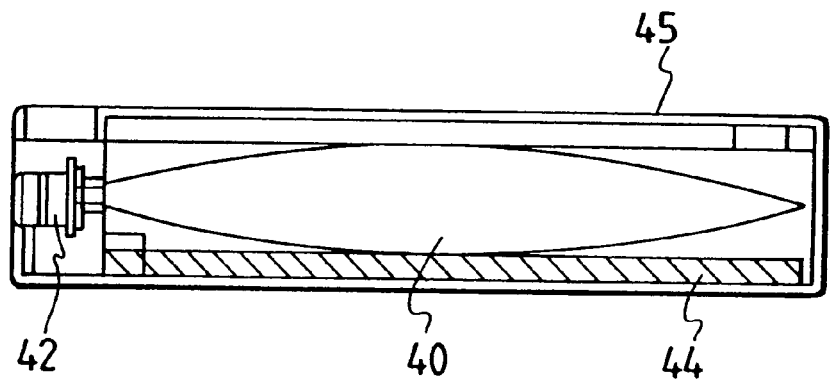
FIG. 5 is a longitudinal cross-sectional view of an ink cartridge.

FIG. 5 illustrates an exemplary ink cartridge 45 in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink. It is preferred that the ink container portion be formed of a polyolefin, in particular, polyethylene, at its surface with which the ink comes into contact.

The ink-jet recording apparatus used in the present invention are not limited to the apparatus as described above in which the head and the ink cartridge are separately provided. Therefore, a device in which these members are integrally formed as shown in FIG. 6 can also be preferably used.

Figure 6:
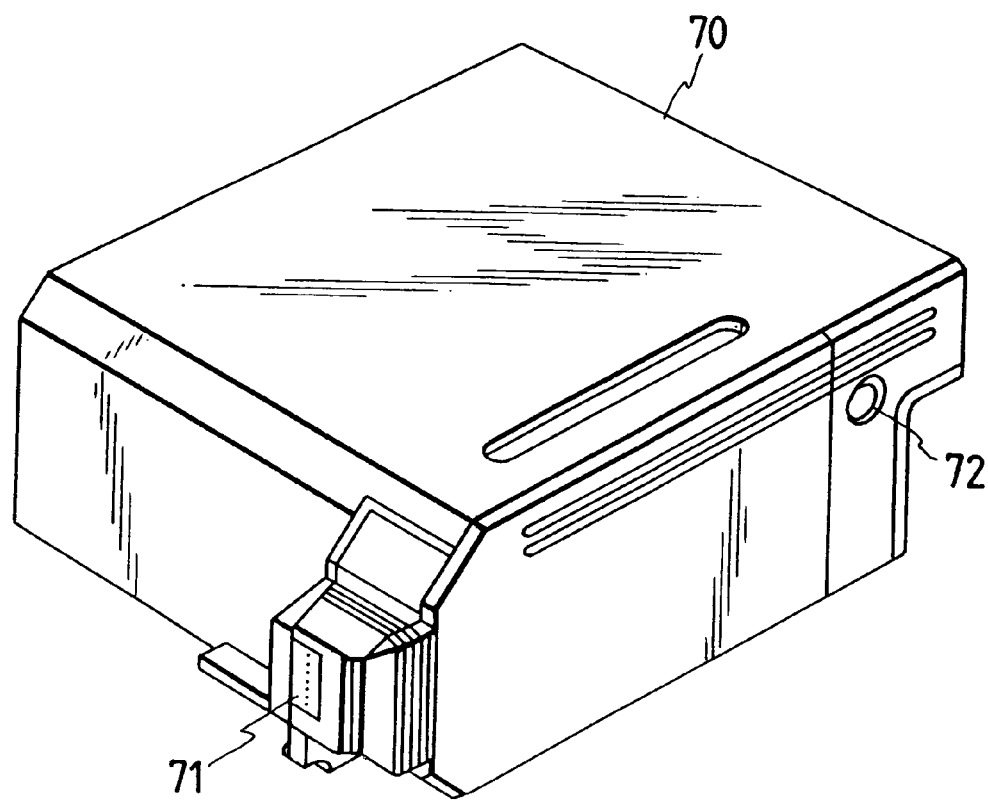
FIG. 6 is a perspective view illustrating an exemplary recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. In the present invention, polyurethane, cellulose or polyvinyl acetate is preferably used as a material for the ink-absorbing member.

Reference numeral 72 indicates an air passage for communicating the interior of the recording unit 70 with the atmosphere. This recording unit 70 can be used in place of the recording head 65 shown in FIG. 4, and is detachably installed on the carriage 66.

As the second form of the ink-jet recording apparatus making good use of mechanical energy, may be mentioned an On-Demand type ink-jet recording apparatus comprising a nozzle-forming base having a plurality of nozzles, pressure-generating elements composed of a piezoelectric material and an electrically conductive material provided in an opposing relation with the nozzles, and an ink filled around the pressure-generating elements, in which the pressure-generating elements are displaced by voltage applied to eject minute droplets of the ink from the nozzles. An example of the construction of a recording head, which is a main component of such a recording apparatus, is illustrated in FIG. 7.

The head is composed of an ink flow path 80 communicating with an ink chamber (not illustrated), an orifice plate 81 through which ink droplets having a desired volume are ejected, a vibration plate 82 directly applying a pressure to the ink, a piezoelectric element 83 bonded to the vibration plate 82 undergoing displacement according to an electric signal, and a substrate 84 adapted to support and fix the piezoelectric element 83, the orifice plate 81 and the vibration plate 82 thereon.

Figure 7:
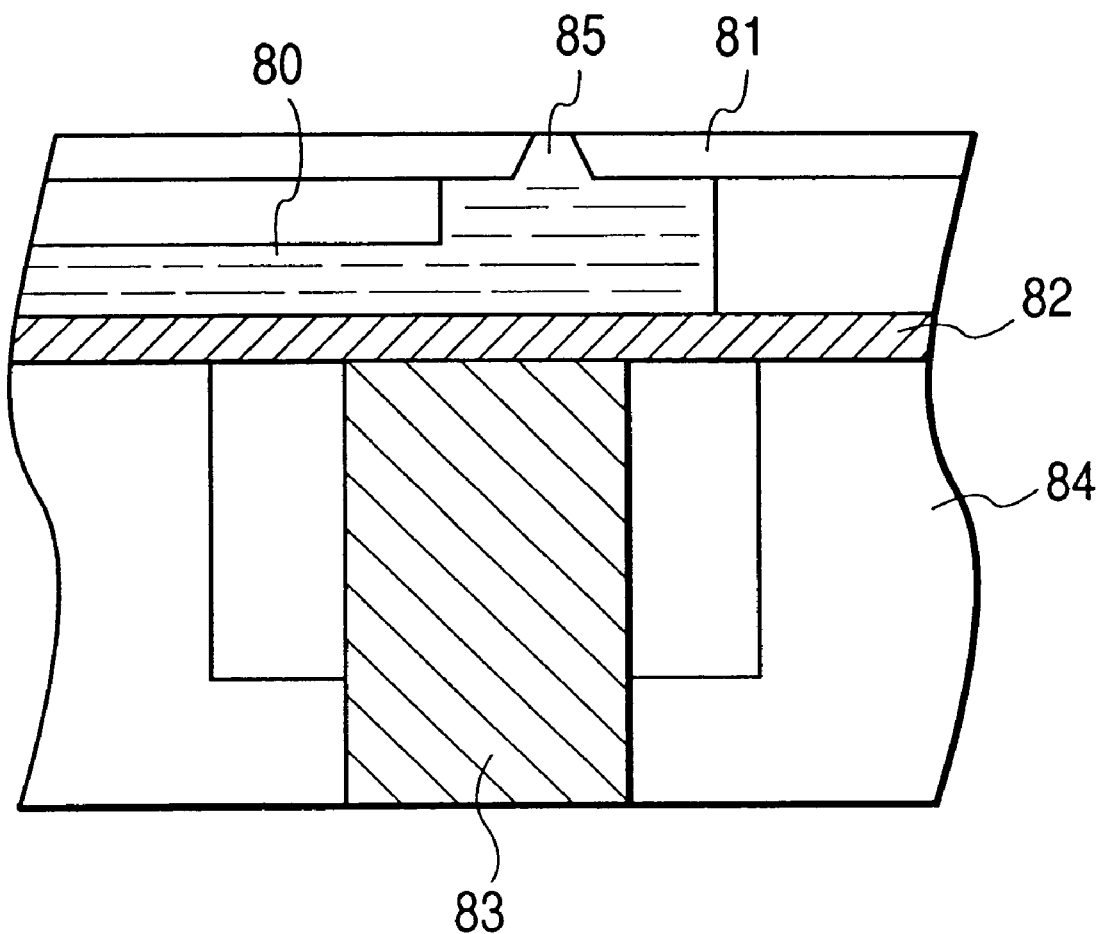
FIG. 7 schematically illustrates an example of the construction of an ink-jet recording head using a piezoelectric element.

In FIG. 7, the ink flow path 80 is formed with a photosensitive resin or the like. The orifice plate 81 is made of a metal such as stainless steel or nickel, the ejection opening 85 of which is defined by electroforming, punching by press working, or the like. The vibration plate 82 is formed with a film of a metal such as stainless steel, nickel or titanium and a high-modulus resin film or the like. The piezoelectric element 83 is made of a dielectric material such as barium titanate or PZT.

The recording head with the above constitution is operated in such a manner that pulsed voltage is applied to the piezoelectric element 83 to generate a stress to cause distortion, the vibration plate 82 bonded to the piezoelectric element 83 is deformed by the energy of the stress, and the ink in the ink flow path 80 is thus perpendicularly pressurized to eject droplets (not illustrated) of the ink from the ejection opening 85 of the orifice plate 81, thereby conducting recording.

Such a recording head is used by incorporating it into a recording apparatus similar to that illustrated in FIG. 4. Operation of details of the recording apparatus may be conducted in the same manner as described above.

The present invention will hereinafter be described in more detail by the following examples and comparative examples. Incidentally, all designations of "part" or "parts" as will be used in the following examples mean part or parts by weight unless expressly noted.

EXAMPLE 1

[Synthesis of a reaction product of a reactive dye with an amino compound]

Purified water to 100 parts was added to 12 parts (in terms of solids) of Kayacion Black P-NBR (Black) (trade name, product of Nippon Kayaku Co., Ltd.) of the monochlorotriazine type as a reactive dye and 14 parts of aminopolyethylene oxide (weight average molecular weight: 2,000; number of amino groups: 2) as an amino compound. The mixture was heated and stirred for 5 hours in a thermostatic chamber controlled at 80° C., thereby reacting the reactive dye with the amino compound.

At the initial stage of the reaction, the pH of the reaction mixture was 11.8. However, it turned to 8.6 after the reaction. The dye before and after the reaction was subjected to thin-layer chromatography. As a result, only one spot of the dye was observed before the reaction, and two spots of dyes appeared after the reaction. It was thus identified that the dye was reacted with aminopolyethylene oxide. Thereafter, the thus-obtained reaction product was isolated and purified.

[Preparation of recording ink]

The following components were mixed, and the resultant mixture was filtered under pressure through a membrane filter (Fluoropore Filter, trade name; product of Sumitomo Electric Industries, Ltd.) having a pore size of 0.22 μm, thereby preparing a black ink.

[Composition of black ink]

| Reaction product described above | 30 parts |
| Diethylene glycol | 15 parts |
| Ethanol | 3 parts |
| Acetylene glycol (EO: 10 mol) | 1 part |
| Purified water | 51 parts. |

(Note) "EO: 10 mol" means 10 moles of ethylene oxide.

EXAMPLE 2

[Synthesis of a reaction product]

A reaction product was obtained in the same manner as in Example 1 except that the combination of the reactive dye and the amino compound was changed to the following combination.

| Hue | Reactive dye | Amino compound | pH Before reaction | pH After reaction |
|---|---|---|---|---|
| Yellow | Kayacion Yellow P5G | Similar compound to that of Ex. 1; having trimethylamino groups at terminals (2 quaternary ammonium groups) | 10.8 | 5.9 |

The solution before and after the synthesis was subjected to thin-layer chromatography to identify the synthesis. As a result, only one spot of a dye was there before the synthesis. After the synthesis, the spot having the same Rf value as that before the synthesis became faint, and an another spot appeared at an Rf value smaller than the Rf value before the synthesis after the synthesis (it is considered that the Rf value became smaller because the molecular weight became higher). The thus-obtained reaction product was isolated and purified.

[Preparation of recording ink]

The following components were mixed, and the resultant mixture was filtered under pressure through a membrane filter (Fluoropore Filter, trade name; product of Sumitomo Electric Industries, Ltd.) having a pore size of 0.22 μm, thereby preparing a yellow ink.

[Composition of yellow ink]

| Reaction product described above | 30 parts |
| Diethylene glycol | 15 parts |
| Ethanol | 3 parts |
| Acetylene glycol (EO: 10 mol) | 1 part |
| Purified water | 51 parts. |

EXAMPLE 3

[Synthesis of a reaction product]

A reaction product was obtained in the same manner as in Example 1 except that the combination of the chlorotriazine type reactive dye and the amino compound was changed to the following combination, and the amount of the amino compound was changed to 1.4 g.

| Hue | Reactive dye | Amino compound | pH Before reaction | pH After reaction |
|---|---|---|---|---|
| Magenta | Kayacion Red E8BN | Similar compound to that of Ex. 1; Molecular weight: 200 | 10.3 | 6.3 |

[Preparation of recording ink]
The following components were mixed, and the resultant mixture was filtered under pressure through a membrane filter (Fluoropore Filter, trade name; product of Sumitomo Electric Industries, Ltd.) having a pore size of 0.22 μm, thereby preparing a magenta ink.
[Composition of magenta ink]

| | |
|---|---|
| Reaction product described above | 30 parts |
| Diethylene glycol | 15 parts |
| Ethanol | 3 parts |
| Acetylene glycol (EO: 10 mol) | 1 part |
| Purified water | 51 parts. |

EXAMPLE 4
[Synthesis of a reaction product]
A reaction product was obtained in the same manner as in Example 1 except that the combination of the chlorotriazine type reactive dye and the amino compound was changed to the following combination, and the amount of the amino compound was changed to 21.4 g.

| Hue | Reactive dye | Amino compound | pH Before reaction | pH After reaction |
|---|---|---|---|---|
| Cyan | Kayacion Turquoise E-NA | Similar compound to that of Ex. 1; Molecular weight: 3,000 | 11.8 | 8.6 |

[Preparation of recording ink]
The following components were mixed, and the resultant mixture was filtered under pressure through a membrane filter (Fluoropore Filter, trade name; product of Sumitomo Electric Industries, Ltd.) having a pore size of 0.22 μm, thereby preparing a cyan ink.
[Composition of cyan ink]

| | |
|---|---|
| Reaction product described above | 30 parts |
| Diethylene glycol | 15 parts |
| Ethanol | 3 parts |
| Acetylene glycol (EO: 10 mol) | 1 part |
| Purified water | 51 parts. |

EXAMPLE 5
[Synthesis of a reaction product]
A reaction product was obtained in the same manner as in Example 1 except that the combination of the chlorotriazine type reactive dye and the amino compound was changed to the following combination, and the amount of the amino compound was changed to 2.6 g.

| Hue | Reactive dye | Amino compound | pH Before reaction | pH After reaction |
|---|---|---|---|---|
| Black | Kayacion Black P-NBR | Glucosan (Mw = 179) | 11 | 7.1 |

[Preparation of recording ink]
The following components were mixed, and the resultant mixture was filtered under pressure through a membrane filter (Fluoropore Filter, trade name; product of Sumitomo Electric Industries, Ltd.) having a pore size of 0.22 μm, thereby preparing a black ink.
[Composition of black ink]

| | |
|---|---|
| Reaction product described above | 30 parts |
| Diethylene glycol | 7.5 parts |
| Triethylene glycol monobutyl ether | 7.5 parts |
| Purified water | 55 parts. |

EXAMPLE 6
[Synthesis of a reaction product]
A reaction product was obtained in the same manner as in Example 1 except that a combination of the following nicotinic type reactive dye as a reactive dye and the following amino compound was used, and the amount of the amino compound was changed to 3.2 g.

| Hue | Reactive dye | Amino compound | pH Before reaction | pH After reaction |
|---|---|---|---|---|
| Yellow | Kayacelon Reactive Yellow CN-SL | N-Trimethyl-glucose (Mw = 221) | 11 | 8.6 |

[Preparation of recording ink]
The following components were mixed, and the resultant mixture was filtered under pressure through a membrane filter (Fluoropore Filter, trade name; product of Sumitomo Electric Industries, Ltd.) having a pore size of 0.22 μm, thereby preparing a yellow ink.
[Composition of yellow ink]

| | |
|---|---|
| Reaction product described above | 30 parts |
| Diethylene glycol | 7.5 parts |
| Triethylene glycol monobutyl ether | 7.5 parts |
| Purified water | 55 parts. |

EXAMPLE 7
[Synthesis of a reaction product]
A reaction product was obtained in the same manner as in Example 6 except that the combination of the nicotinic type reactive dye and the amino compound was changed to the following combination, and the amount of the amino compound was changed to 5.5 g.

| Hue | Reactive dye | Amino compound | pH Before reaction | pH After reaction |
|---|---|---|---|---|
| Magenta | Kayacelon Reactive Red CN-7B | N-Acetyl-lactosamine (Mw = 383) | 10.6 | 7.6 |

[Preparation of recording ink]

The following components were mixed, and the resultant mixture was filtered under pressure through a membrane filter (Fluoropore Filter, trade name; product of Sumitomo Electric Industries, Ltd.) having a pore size of 0.22 μm, thereby preparing a magenta ink.

[Composition of magenta ink]

| Reaction product described above | 30 parts |
|---|---|
| Diethylene glycol | 7.5 parts |
| Triethylene glycol monobutyl ether | 7.5 parts |
| Purified water | 55 parts. |

EXAMPLE 8

[Synthesis of a reaction product]

A reaction product was obtained in the same manner as in Example 7 except that the combination of the nicotinic type reactive dye and the amino compound was changed to the following combination.

| Hue | Reactive dye | Amino compound | pH Before reaction | pH After reaction |
|---|---|---|---|---|
| Cyan | Kayacelon Reactive Turquoise | Lacto-N-triose (Mw = 540) | 10.9 | 8.1 |

[Preparation of recording ink]

The following components were mixed, and the resultant mixture was filtered under pressure through a membrane filter (Fluoropore Filter, trade name; product of Sumitomo Electric Industries, Ltd.) having a pore size of 0.22 μm, thereby preparing a cyan ink.

[Composition of cyan ink]

| Reaction product described above | 30 parts |
|---|---|
| Diethylene glycol | 7.5 parts |
| Triethylene glycol monobutyl ether | 7.5 parts |
| Purified water | 55 parts. |

EXAMPLE 9

[Synthesis of a reaction product]

A reaction product was obtained in the same manner as in Example 1 except that the combination of the chlorotriazine type reactive dye and the amino compound was changed to the following combination, and the amount of the amino compound was changed to 3.6 g.

| Hue | Reactive dye | Amino compound | pH Before reaction | pH After reaction |
|---|---|---|---|---|
| Black | Kayacelon Black P-N | EO adduct of glycerol; n + m + k = 15; having amino groups at terminals (Mw = 750) | 11.8 | 8.1 |

[Preparation of recording ink]

The following components were mixed, and the resultant mixture was filtered under pressure through a membrane filter (Fluoropore Filter, trade name; product of Sumitomo Electric Industries, Ltd.) having a pore size of 0.22 μm, thereby preparing a black ink.

[Composition of black ink]

| Reaction product described above | 30 parts |
|---|---|
| Diethylene glycol | 7.5 parts |
| Ethylene glycol | 7.5 parts |
| Isopropanol | 3 parts |
| Surflon 113 (trade name, product of Asahi Glass Co., Ltd.) | 0.5 parts |
| Purified water | 51.5 parts. |

EXAMPLE 10

[Synthesis of a reaction product]

A reaction product was obtained in the same manner as in Example 1 except that the combination of the chlorotriazine type reactive dye and the amino compound was changed to the following combination, and the amount of the amino compound was changed to 6.7 g.

| Hue | Reactive dye | Amino compound | pH Before reaction | pH After reaction |
|---|---|---|---|---|
| Yellow | Kayaceion Yellow P5G | EO adduct of glycerol; n + m + k = 90; having amino groups at terminals (Mw = 1,410) | 12 | 6.5 |

[Preparation of recording ink]

The following components were mixed, and the resultant mixture was filtered under pressure through a membrane filter (Fluoropore Filter, trade name; product of Sumitomo Electric Industries, Ltd.) having a pore size of 0.22 μm, thereby preparing a yellow ink.

[Composition of yellow ink]

| Reaction product described above | 30 parts |
|---|---|
| Diethylene glycol | 7.5 parts |
| Ethylene glycol | 7.5 parts |
| Isopropanol | 3 parts |

-continued

| | |
|---|---|
| Surflon 113 (trade name, product of Asahi Glass Co., Ltd.) | 0.5 parts |
| Purified water | 51.5 parts. |

EXAMPLE 11
[Synthesis of a reaction product]

A reaction product was obtained in the same manner as in Example 1 except that a combination of the following vinylsulfone type reactive dye as a reactive dye and the following amino compound was used, and the amount of the amino compound was changed to 7.14 g.

| | | | pH | |
|---|---|---|---|---|
| Hue | Reactive dye | Amino compound | Before reaction | After reaction |
| Magenta | Duasyn Red 3B-SF (product of Hoechst AG) | Polyethylene-imine having Mw of 1,000 | 11.7 | 9.5 |

[Preparation of recording ink]

The following components were mixed, and the resultant mixture was filtered under pressure through a membrane filter (Fluoropore Filter, trade name; product of Sumitomo Electric Industries, Ltd.) having a pore size of 0.22 μm, thereby preparing a magenta ink.
[Composition of magenta ink]

| | |
|---|---|
| Reaction product described above | 30 parts |
| Diethylene glycol | 7.5 parts |
| Ethylene glycol | 7.5 parts |
| Isopropanol | 3 parts |
| Surflon 113 (trade name, product of Asahi Glass Co., Ltd.) | 0.5 parts |
| Purified water | 51.5 parts. |

EXAMPLE 12
[Synthesis of a reaction product]

A reaction product was obtained in the same manner as in Example 11 except that the combination of the vinylsulfone type reactive dye and the amino compound was changed to the following combination, and the amount of the amino compound was changed to 3.57 g.

| | | | pH | |
|---|---|---|---|---|
| Hue | Reactive dye | Amino compound | Before reaction | After reaction |
| Cyan | Duasyn Blue R-KG (product of Hoechst AG) | Polyethylene-imine having Mw of 1,000 | 11.7 | 9.9 |

[Preparation of recording ink]

The following components were mixed, and the resultant mixture was filtered under pressure through a membrane filter (Fluoropore Filter, trade name; product of Sumitomo Electric Industries, Ltd.) having a pore size of 0.22 μm, thereby preparing a cyan ink.
[Composition of cyan ink]

| | |
|---|---|
| Reaction product described above | 30 parts |
| Diethylene glycol | 15 parts |
| Ethanol | 3 parts |
| Acetylene glycol (EO: 10 mol) | 1 part |
| Purified water | 51 parts. |

COMPARATIVE EXAMPLE 1

The following components were mixed, and the resultant mixture was filtered under pressure through a membrane filter (Fluoropore Filter, trade name; product of Sumitomo Electric Industries, Ltd.) having a pore size of 0.22 μm, thereby preparing a black ink.
[Composition of black ink]

| | |
|---|---|
| Reactive dye [Kayacion Black P-NBR (Black)] | 30 parts |
| Diethylene glycol | 15 parts |
| Ethanol | 3 parts |
| Acetylene glycol (EO: 10 mol) | 1 part |
| Purified water | 51 parts. |

COMPARATIVE EXAMPLE 2

The following components were mixed, and the resultant mixture was filtered under pressure through a membrane filter (Fluoropore Filter, trade name; product of Sumitomo Electric Industries, Ltd.) having a pore size of 0.22 μm, thereby preparing a black ink.
[Composition of black ink]

| | |
|---|---|
| C.I. Direct Black 154 | 30 parts |
| Diethylene glycol | 15 parts |
| Ethanol | 3 parts |
| Acetylene glycol (EO: 10 mol) | 1 part |
| Purified water | 51 parts. |

COMPARATIVE EXAMPLE 3
[Synthesis of a reaction product]

A reaction product was obtained in the same manner as in Example 11 except that the combination of the vinylsulfone type reactive dye and the amino compound was changed to the following combination, and the amount of the amino compound was changed to 71.4 g.

| | | | pH | |
|---|---|---|---|---|
| Hue | Reactive dye | Amino compound | Before reaction | After reaction |
| Cyan | Duasyn Blue R-KG (product of Hoechst AG) | Polyethylene-imine having Mw of 10,000 | 11.7 | 9.9 |

[Preparation of recording ink]

The following components were mixed, and the resultant mixture was filtered under pressure through a membrane filter (Fluoropore Filter, trade name; product of Sumitomo Electric Industries, Ltd.) having a pore size of 0.22 μm, thereby preparing a cyan ink.

[Composition of cyan ink]

| Reaction product described above | 30 parts |
|---|---|
| Diethylene glycol | 15 parts |
| Ethanol | 3 parts |
| Acetylene glycol (EO: 10 mol) | 1 part |
| Purified water | 51 parts. |

[Evaluation]

(1) Eight kinds of paper shown in the following Table 1, the stöckigt sizing degrees of which are different from one another, were provided as paper for evaluation.

TABLE 1

| | Kind of paper | Stöckigt sizing degree |
|---|---|---|
| Paper 1 | NP-SK (product of Sanyo-Kokusaku Pulp Co., Ltd.) | 25 seconds |
| Paper 2 | NP-DK (product of Daishowa Paper Mfg. Co., Ltd.) | 24 seconds |
| Paper 3 | PLOVER BOND | 35 seconds |
| Paper 4 | Classic Laid | 33 seconds |
| Paper 5 | Gilbert Bond | 30 seconds |
| Paper 6 | Hammermill #20 | 12 seconds |
| Paper 7 | Ardor Bond | 44 seconds |
| Paper 8 | Chanpion D. C | 17 seconds |

Figure 8:
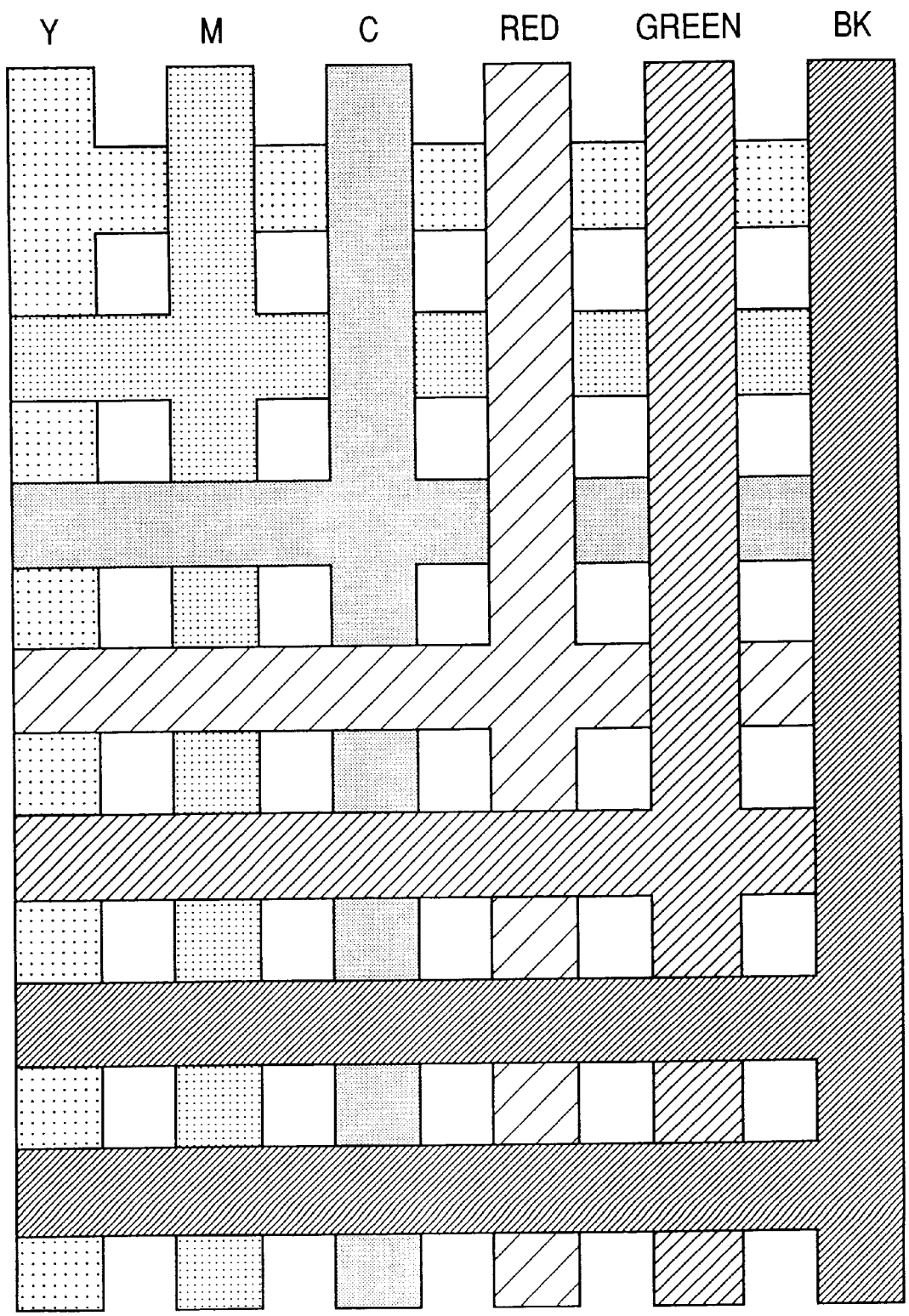
FIG. 8 is an explanatory drawing illustrating a print pattern for evaluating coloration.

(2) The black, yellow, magenta and cyan inks prepared respectively in Examples 1 to 4 were separately put into ink tanks in an ink-jet printer BJC600 (360 dpi) (trade name; manufactured by Canon Inc.) to print a print pattern shown in FIG. 8 on the eight kinds of the recording media in accordance with the printing mode for plain paper.

(3) Printing was conducted in the same manner as in the step (2) except that the combination of the inks was changed to a combination of the black, yellow, magenta and cyan inks prepared respectively in Examples 5 to 8.

(4) Printing was conducted in the same manner as in he step (2) except that the combination of the inks was hanged to a combination of the black, yellow, magenta and cyan inks prepared respectively in Examples 9 to 12.

(5) Printing was conducted in the same manner as in the step (2) except that the combination of the inks was changed to a combination of the black ink prepared in Comparative Example 1, and the yellow, magenta and cyan inks prepared respectively in Examples 2 to 4.

(6) Printing was conducted in the same manner as in the step (2) except that the combination of the inks was changed to a combination of the black ink prepared in Comparative Example 2, and the yellow, magenta and cyan inks prepared respectively in Examples 2 to 4.

(7) Printing was conducted in the same manner as in the step (2) except that the combination of the inks was changed to a combination of the black, yellow and magenta inks prepared respectively in Examples 1 to 3, and the cyan ink prepared in Comparative Example 3.

With respect to the print samples thus obtained, the inks used were evaluated in the following points.

1) Resistance to Bronzing (B):

Each print sample was left to stand for 24 hours (at about 25° C. and 60 to 70% RH) after the printing, and 20 men and women visually judged whether the print sample became glossy due to the reflection of light, thereby evaluating each ink by the number of persons who answered that no bronzing occurred.

2) Surface Fixing Ability (S.T):

Each print sample was sectioned by a safety razor in such a manner that its surface was not crushed to observe the degree of penetration of the coloring material at its section through a metallurgical microscope.

The surface fixing ability of each ink was ranked in 3 grades in accordance with the following standard:

AA: Not penetrated up to a third from the surface;

A: Not penetrated up to a half from the surface;

C: Penetrated up to at least a half from the surface, and partially struck through.

3) Optical Density (OD):

The optical density of each print sample was measured by a Macbeth reflection densitometer RD914. The measurement was conducted at 5 points to take their average value as an OD value of the sample.

AA: At least 1.25;

A: At least 1.2;

C: Lower than 1.2.

4) Viscosity of Ink:

The viscosity of each ink sample was measured at 25° C. by means of an E-type viscometer.

A: Lower than 3.0 cP;

C: At least 3.0 cP.

5) Storage Stability:

After 60 g of each ink sample were placed in a 100-ml Shot bottle and stored at 60° C. for 7 days, an investigation was made as to whether there was a deposit on the bottom of the bottle. The storage stability was ranked in accordance with the following standard:

A: No deposit occurred;

C: A deposit occurred.

6) Lastingness of Printing:

Each ink sample was charged into an ink cartridge for a monocolor ink-jet printer, BJ10V Printer, (trade name; manufactured by Canon Inc.) to print an A4-sized solid pattern by the printer until the ink was consumed. The lastingness of printing was ranked in accordance with the following standard:

A: Printing could be continuously conducted until the ink was consumed;

C: Blur occurred in the course of printing.

[Evaluation results]

The evaluation results are shown in the following Tables 2 to 4.

TABLE 2

| | Paper 1 | | | Paper 2 | | | Paper 3 | | | Paper 4 | | |
|---|---|---|---|---|---|---|---|---|---|---|---|---|
| | B | S.T | OD | B | S.T | OD | B | S.T | OD | B | S.T | OD |
| Ex. 1 | 20 | AA | A | 20 | AA | A | 20 | AA | A | 20 | AA | A |
| Ex. 2 | 20 | AA | A | 20 | AA | A | 20 | AA | A | 20 | AA | A |

TABLE 2-continued

|  | Paper 1 | | | Paper 2 | | | Paper 3 | | | Paper 4 | | |
| --- | --- | --- | --- | --- | --- | --- | --- | --- | --- | --- | --- | --- |
|  | B | S.T | OD | B | S.T | OD | B | S.T | OD | B | S.T | OD |
| Ex. 3 | 20 | AA | A | 20 | AA | A | 20 | AA | A | 20 | AA | A |
| Ex. 4 | 20 | AA | A | 20 | AA | A | 20 | AA | A | 20 | AA | A |
| Ex. 5 | 20 | AA | A | 20 | AA | A | 20 | AA | A | 20 | AA | A |
| Ex. 6 | 20 | AA | A | 20 | AA | A | 20 | AA | A | 20 | AA | A |
| Ex. 7 | 20 | AA | A | 20 | AA | A | 20 | AA | A | 20 | AA | A |
| Ex. 8 | 20 | AA | A | 20 | AA | A | 20 | AA | A | 20 | AA | A |
| Ex. 9 | 20 | AA | A | 20 | AA | A | 20 | AA | A | 20 | AA | A |
| Ex. 10 | 20 | AA | A | 20 | AA | A | 20 | AA | A | 20 | AA | A |
| Ex. 11 | 20 | AA | A | 20 | AA | A | 20 | AA | A | 20 | AA | A |
| Ex. 12 | 20 | AA | A | 20 | AA | A | 20 | AA | A | 20 | AA | A |
| Comp. Ex. 1 | 9 | C | C | 9 | C | C | 7 | C | C | 10 | C | C |
| Comp. Ex. 2 | 0 | C | C | 0 | C | C | 0 | C | C | 0 | C | C |
| Comp. Ex. 3 | 20 | AA | C | 20 | AA | C | 20 | AA | C | 20 | AA | C |

TABLE 3

|  | Paper 5 | | | Paper 6 | | | Paper 7 | | | Paper 8 | | |
| --- | --- | --- | --- | --- | --- | --- | --- | --- | --- | --- | --- | --- |
|  | B | S.T | OD | B | S.T | OD | B | S.T | OD | B | S.T | OD |
| Ex. 1 | 20 | AA | A | 20 | AA | A | 20 | AA | A | 20 | AA | A |
| Ex. 2 | 20 | AA | AA | 20 | AA | A | 17 | AA | A | 20 | AA | A |
| Ex. 3 | 20 | AA | A | 20 | AA | A | 20 | AA | A | 20 | AA | A |
| Ex. 4 | 20 | AA | A | 20 | AA | A | 20 | AA | A | 20 | AA | A |
| Ex. 5 | 20 | AA | A | 20 | A | A | 18 | AA | A | 20 | A | A |
| Ex. 6 | 20 | AA | A | 20 | A | A | 18 | AA | A | 20 | A | A |
| Ex. 7 | 20 | AA | A | 20 | A | A | 19 | AA | A | 20 | A | A |
| Ex. 8 | 20 | AA | A | 20 | AA | A | 20 | AA | A | 20 | AA | A |
| Ex. 9 | 20 | AA | A | 20 | AA | A | 20 | AA | A | 20 | AA | A |
| Ex. 10 | 20 | AA | A | 20 | AA | A | 20 | AA | A | 20 | AA | A |
| Ex. 11 | 20 | AA | A | 20 | AA | A | 20 | AA | A | 20 | AA | A |
| Ex. 12 | 20 | AA | A | 20 | AA | A | 20 | AA | A | 20 | AA | A |
| Comp. Ex. 1 | 11 | C | C | 7 | C | C | 10 | C | C | 10 | C | C |
| Comp. Ex. 2 | 0 | C | C | 0 | C | C | 0 | C | C | 0 | C | C |
| Comp. Ex. 3 | 20 | AA | C | 20 | AA | C | 20 | AA | C | 20 | AA | C |

TABLE 4

|  | Viscosity of ink | Storage stability | Lastingness of printing |
| --- | --- | --- | --- |
| Example 1 | A | A | A |
| Example 2 | A | A | A |
| Example 3 | A | A | A |
| Example 4 | A | A | A |
| Example 5 | A | A | A |
| Example 6 | A | A | A |
| Example 7 | A | A | A |
| Example 8 | A | A | A |
| Example 9 | A | A | A |
| Example 10 | A | A | A |
| Example 11 | A | A | A |
| Example 12 | A | A | A |
| Comparative Example 1 | A | A | A |
| Comparative Example 2 | A | A | A |
| Comparative Example 3 | C | C | C |

(Note) B: Resistance to bronzing; S.T: Surface fixing ability; OD: Optical density.

As described above, the inks using the reaction product of the reactive dye with the amino compound according to the present invention can prevent discoloration (bronzing) of prints caused by crystallization of the reactive dye, since the polymer bonded to the reactive dye proves a hindrance to inhibit the crystallization of the reactive dye.

Since the coloring material remains on the surface of a recording medium by virtue of the polymer bonded to the reactive dye, prints having good coloring ability can be provided irrespective of difference in ink absorbency among recording media.

Further, since the reactive dyes are used, the water-based inks according to the present invention have excellent light fastness and light transmission property. Since such reaction products as described above are used, the water-based inks according to the present invention do not interfere with reliability typified by the followability, resistance to kogation, recovery property from clogging and long-term storage stability of ink.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A water-based ink for ink-jet recording, comprising a reaction product between a reactive dye and an ethylene oxide adduct of glycerol, wherein the ethylene oxide adduct has from 15 to 90 ethylene oxide units in the molecule thereof, and has 1 to 3 primary amino groups or 1 to 3 quaternary ammonium groups in the molecule thereof.

2. The water-based ink for ink-jet recording according to claim 1, wherein the ethylene oxide adduct of glycerol is at least one of compounds represented by structural formulae

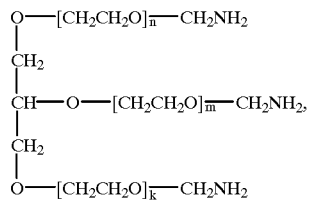

(13)

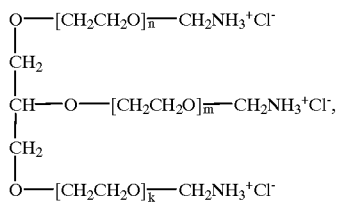

(14)

n+m+k=15 to 90

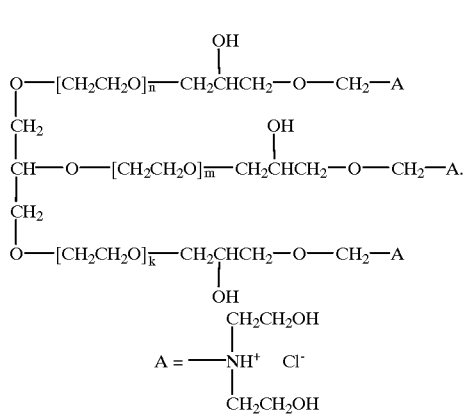

(15)

n+m+k=15 to 90.

3. The water-based ink for ink-jet recording according to claim 1, wherein the reactive dye has a monochlorotriazine group, dichlorotriazine group or trichlorotriazine group as a reactive group.

4. The water-based ink for ink-jet recording according to claim 1, wherein the reactive dye has a vinylsulfone group as a reactive group.

5. The water-based ink for ink-jet recording according to claim 1, wherein the reactive dye has a nicotinic acid group as a reactive group.

6. The water-based ink for ink-jet recording according to claim 1, wherein the reaction product has a solubility in water of at least 10% by weight at a pH ranging from 5 to 10.

7. An ink-jet recording process comprising the step of applying energy to the water-based ink for ink-jet recording according to claim 1 to eject the ink from an orifice of a recording head toward a recording medium, thereby applying the ink to the recording medium to conduct recording.

8. The ink-jet recording process according to claim 7, wherein the energy is thermal energy.

9. The ink-jet recording process according to claim 7, wherein the energy is mechanical energy.

10. A recording unit comprising an ink container portion with the water-based ink for ink-jet recording according to claim 1 held therein, and a recording head equipped with a means for applying energy to the ink to eject the ink from an orifice.

11. The recording unit according to claim 10, wherein the energy is thermal energy.

12. The recording unit according to claim 10, wherein the energy is mechanical energy.

13. The recording unit according to claim 10, wherein the ink container portion comprises at least one of polyurethane, cellulose, polyvinyl acetate and a polyolefin resin.

14. The recording unit according to claim 13, wherein the ink container portion is composed of the polyolefin resin.

15. An ink cartridge comprising an ink container portion with the water-based ink for ink-jet recording according to claim 11 held therein.

16. The ink cartridge according to claim 15, wherein the ink container portion comprises at least one of polyurethane, cellulose, polyvinyl acetate and a polyolefin resin.

17. The ink cartridge according to claim 16, wherein the ink container portion is composed of the polyolefin resin.

18. An ink-jet recording apparatus comprising the recording unit according to claim 10, and a means for driving the recording unit in response to signals to eject an ink.

19. An ink-jet recording apparatus comprising the ink cartridge according to claim 15, a recording head equipped with a means for applying energy to an ink contained in the ink cartridge to eject the ink from an orifice, and a means for driving the recording head in response to signals to eject the ink.

* * * * *

UNITED STATES PATENT AND TRADEMARK OFFICE
CERTIFICATE OF CORRECTION

PATENT NO.   : 6,056,811
DATED        : May 2, 2000
INVENTOR(S)  : Masako Shimomura et al.

It is certified that error appears in the above-identified patent and that said Letters Patent is hereby corrected as shown below:

Title page,
Item [56], References Cited, U.S. PATENT DOCUMENTS, before
"4,962,190     10/1990    Mayer et al.........534/573" insert
-- 4,664,708   5/1987     Allen ............... 106/22 --;
after "4,966,607     10/1990    Shinoki et al ....... 8/549" insert
-- 5,006,862   4/1991     Adamic ................ 106/31.36 --;
after "5,098,475   3/1992    Winnik et al.......... 106/22" insert
-- 5,102,459   4/1992     Ritter et al. .......... 106/31.36
   5,626,654   5/1997     Breton et al. ......... 106/31.33 --.
FOREIGN PATENT DOCUMENTS, before
"0 317 859 A2  5/1989  European Pat. Off. ." insert
-- 62-16232    4/1987    Japan
   62-119279   5/1987    Japan --.

Item [57], ABSTRACT,
Line 9, "lare" should read -- lar --.

Column 1,
Line 12, "that" should read --in which --.
Line 62, "ink" should read -- inks --.

Column 3,
Lines 7, 9, 33, 35, 61 and 63, "molecular" should read -- molecule --.

Column 4,
Line 21, 23, 47 and 49, "molecular" should read -- molecule --.

Column 5,
Lines 10 and 12, "molecular" should read -- molecule --.
Line 41, "hard" should read -- unlikely --.

Column 6,
Lines 26 and 28, "molecular" should read -- molecule --.

Column 7,
Line 21, "hard" should read -- unlikely --.

UNITED STATES PATENT AND TRADEMARK OFFICE
CERTIFICATE OF CORRECTION

PATENT NO.    : 6,056,811
DATED         : May 2, 2000
INVENTOR(S)   : Masako Shimomura et al.

It is certified that error appears in the above-identified patent and that said Letters Patent is hereby corrected as shown below:

Column 9,
Lines 1-10,

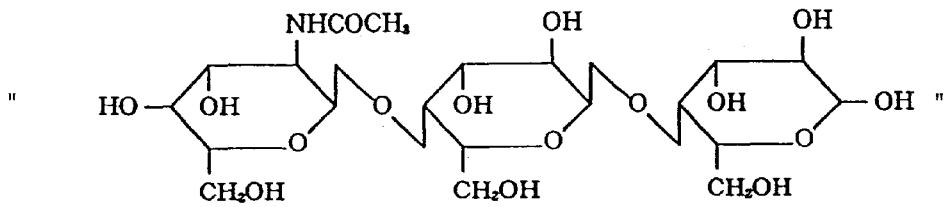

should read $$L + m = 1 \text{ to } 3$$
$$3 \leq L + m + n \leq 20$$

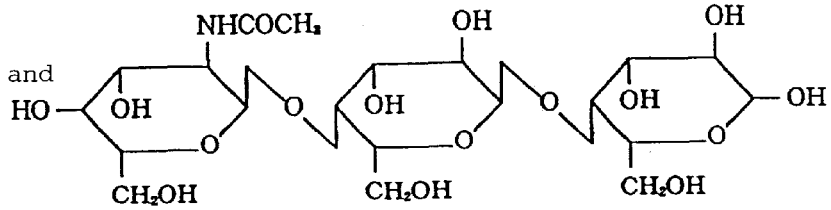

Column 10,
Line 25, "n+m+k = 15 to 90" should read
-- n+m+k = 15 to 90
        and --.
Column 11,
Line 9, "n = 1 to 20" should read
-- n = 1 to 20
        and --.

Column 13,
Line 18, "Brilliant Blue P-BR," (first occurrence) should be deleted.

UNITED STATES PATENT AND TRADEMARK OFFICE
CERTIFICATE OF CORRECTION

PATENT NO.    : 6,056,811
DATED         : May 2, 2000
INVENTOR(S)   : Masako Shimomura et al.

It is certified that error appears in the above-identified patent and that said Letters Patent is hereby corrected as shown below:

Column 14,
Line 37, "evils" should read -- problems --.
Line 38, "brought." should read -- caused. --.
Line 46, "agents," should read -- agent, --.
Line 47, "antioxidants" should read -- antioxidant -- and "adjustors." should read -- adjustor. --.

Column 18,
Line 37, "an another" should read -- another --.

Column 22,
Line 46, "Kayaceion" should read -- Kayacion --.
Line 53, after the Table insert
-- (Note)   The reactive dyes used in Examples 2 to 10 are
            all products of Nippon Kayaku Co., Ltd. EO
            means ethylene oxide; n+m+k denotes the
            number of moles of ethylene oxide added. --.

Column 25,
Line 40, "in he" should read -- in the --.
Line 41, "hanged" should read -- changed --.

Column 27,
Table 3,
```
 "Ex.  1      20      AA      A
  Ex.  2      20      AA      AA"  should read -Ex.  1      20      AA      AA
  EX.  2      20      AA      A --.
```

Column 29,
Line 32, "$NH_2$," should read -- $NH_2$ --.
Line 36, below formula (13) insert -- n+m+k=15 to 90 --.
Line 37, "(14)" should read -- (14), and --.
Line 42, "Cl⁻," should read -- Cl⁻ --.
Line 55, "–A." should read -- –A --.

UNITED STATES PATENT AND TRADEMARK OFFICE
CERTIFICATE OF CORRECTION

PATENT NO.    : 6,056,811
DATED         : May 2, 2000
INVENTOR(S)   : Masako Shimomura et al.

It is certified that error appears in the above-identified patent and that said Letters Patent is hereby corrected as shown below:

Column 30,
Line 48, "claim 11" should read -- claim 1 --.

Signed and Sealed this

Fourth Day of May, 2004

JON W. DUDAS
*Acting Director of the United States Patent and Trademark Office*